(12) United States Patent
Johnson

(10) Patent No.: US 10,288,400 B2
(45) Date of Patent: May 14, 2019

(54) NUT AND STUD SIZE GAUGE

(71) Applicant: Wesley Keith Johnson, Northridge, CA (US)

(72) Inventor: Wesley Keith Johnson, Northridge, CA (US)

( * ) Notice: Subject to any disclaimer, the term of this patent is extended or adjusted under 35 U.S.C. 154(b) by 208 days.

(21) Appl. No.: 15/168,834

(22) Filed: May 31, 2016

(65) Prior Publication Data

US 2016/0349030 A1 Dec. 1, 2016

Related U.S. Application Data

(60) Provisional application No. 62/230,219, filed on Jun. 1, 2015.

(51) Int. Cl.
*G01B 3/04* (2006.01)
*G01B 3/20* (2006.01)
*G01B 5/08* (2006.01)

(52) U.S. Cl.
CPC ............ *G01B 3/04* (2013.01); *G01B 3/20* (2013.01); *G01B 5/08* (2013.01)

(58) Field of Classification Search
CPC .......... G01B 3/04; G01B 3/20; G01B 5/08
USPC .......................................................... 33/494
See application file for complete search history.

(56) References Cited

U.S. PATENT DOCUMENTS

| | | | | |
|---|---|---|---|---|
| 310,420 A | * | 1/1885 | Hellings | B23Q 17/0938 33/201 |
| 325,096 A | * | 8/1885 | Coffin et al. | G01B 3/004 33/494 |
| 494,169 A | * | 3/1893 | Schaum | B23Q 17/0938 33/201 |
| 552,238 A | * | 12/1895 | Darling | G01B 3/40 33/199 R |
| 802,402 A | * | 10/1905 | Martin | G01B 3/30 33/567 |
| 1,287,040 A | * | 12/1918 | Junker | G01B 3/166 235/61 B |
| 1,373,367 A | * | 3/1921 | Summers | B25D 5/00 33/673 |
| 1,515,398 A | * | 11/1924 | Marcussen | G01N 33/06 33/524 |
| 2,078,156 A | * | 4/1937 | Perry | G01B 1/00 33/493 |
| D157,404 S | * | 2/1950 | Nowak | 33/563 |
| 2,640,273 A | | 6/1953 | Larsen et al. | |
| 2,694,262 A | * | 11/1954 | Daniel | B23Q 17/0928 33/199 R |
| 2,722,150 A | * | 11/1955 | Green | B25B 13/14 81/165 |
| D182,193 S | * | 2/1958 | Minors | D10/62 |
| 3,173,212 A | * | 3/1965 | Fredrickson | G11B 27/34 33/494 |

(Continued)

*Primary Examiner* — R. A. Smith
*Assistant Examiner* — Tania Courson
(74) *Attorney, Agent, or Firm* — Colin P. Abrahams

(57) ABSTRACT

A size gauge for a nut having flat edges, the size gauge comprises a first surface against which a first flat of the nut is placed, and a second surface against which a second flat of the nut which is adjacent the first flat is placed. The second surface is at an angle of about 120 degrees to the first surface. Distance markings are provided on the side gauge at or near the first surface, the distance markings indicating an across flat measurement based on the length of the flat.

17 Claims, 17 Drawing Sheets

(56) References Cited

U.S. PATENT DOCUMENTS

| | | | | |
|---|---|---|---|---|
| 3,376,766 | A * | 4/1968 | Vienat | B25B 13/12 |
| | | | | 81/125.1 |
| 3,751,814 | A * | 8/1973 | Crawford | G01B 3/004 |
| | | | | 33/494 |
| 4,028,970 | A * | 6/1977 | Pelczar | B25B 13/04 |
| | | | | 81/165 |
| 4,058,900 | A * | 11/1977 | Yandell | G01B 3/38 |
| | | | | 33/199 R |
| D247,849 | S * | 5/1978 | Pierce | D10/64 |
| 4,138,820 | A | 2/1979 | O'Connor | |
| D278,691 | S * | 5/1985 | Sorrell | D10/64 |
| 4,677,751 | A * | 7/1987 | Masseth | G01B 5/02 |
| | | | | 33/199 R |
| 4,730,399 | A * | 3/1988 | Campbell | G01B 5/0025 |
| | | | | 33/203 |
| 4,745,685 | A * | 5/1988 | Castillo | G01B 5/163 |
| | | | | 33/199 R |
| 4,843,721 | A | 7/1989 | Hoge | |
| 4,897,931 | A * | 2/1990 | Goulette | G01B 3/20 |
| | | | | 33/532 |
| D346,752 | S * | 5/1994 | Krusling | D10/64 |
| 5,345,636 | A * | 9/1994 | Lamons | B25B 13/10 |
| | | | | 7/107 |
| 5,548,903 | A * | 8/1996 | Johnson | G01B 3/20 |
| | | | | 33/679.1 |
| D384,297 | S * | 9/1997 | Paynes | D10/64 |
| D428,819 | S * | 8/2000 | Kwon | D10/73 |
| D546,211 | S * | 7/2007 | Sorrell | D10/64 |
| 7,607,237 | B2 * | 10/2009 | Schafer | G01B 3/34 |
| | | | | 33/501.45 |
| 7,685,736 | B2 * | 3/2010 | Steely | E21B 17/042 |
| | | | | 116/208 |
| D637,500 | S * | 5/2011 | Corbin | D10/64 |
| 8,151,479 | B1 * | 4/2012 | Carnegie | G01B 3/38 |
| | | | | 33/548 |
| D697,824 | S * | 1/2014 | Riffle | D10/73 |
| D755,063 | S * | 5/2016 | Leong | D10/64 |
| 9,372,060 | B1 * | 6/2016 | Howard | G01B 3/20 |
| 9,689,653 | B2 * | 6/2017 | Baskovic | G01B 3/20 |
| D817,196 | S * | 5/2018 | Haarburger | D10/64 |
| 2005/0120575 | A1 | 6/2005 | Molmann | |
| 2008/0229598 | A1 * | 9/2008 | Liu | G01B 3/20 |
| | | | | 33/562 |
| 2009/0288308 | A1 * | 11/2009 | Hsieh | B25B 13/04 |
| | | | | 33/810 |
| 2010/0186250 | A1 | 7/2010 | Hu | |
| 2012/0233893 | A1 * | 9/2012 | Poole | G01B 3/04 |
| | | | | 40/299.01 |

* cited by examiner

NUT AND STUD SIZE GAUGE

CROSS-REFERENCE TO RELATED APPLICATIONS

This application claims the benefit of U.S. Provisional Patent Application No. 62/230,219 filed Jun. 1, 2015, the contents of which are incorporated herein by reference in their entirety.

FIELD AND BACKGROUND OF THE INVENTION

This invention relates to a device and method for measuring the size of a nut or stud for the purposes of selecting a tool of appropriate corresponding size in order to tighten or loosen the nut or stud.

While the device and method of the invention may be used for any size nut or stud, it has a particularly useful application when directed at Heavy Hex sizes in metric and imperial measurements. Heavy hex sizes as defined by the American National Standards Institute (ANSI), American Society of Mechanical Engineers (ASME) and the International Organization for Standardization (ISO). ASME, ANSI and ISO standard size fasteners are found in many locations and construction environments, including but not limited to refineries, power plants, bridges, structural steel projects and many other industrial settings. The smaller nut sizes, usually found in households or at a local hardware store or on vehicles, lawn mowers or tractors, are set by Society of Automotive Engineers (SAE).

SUMMARY OF THE INVENTION

According to one aspect of the invention, there is provided a size gauge for a nut having flat edges, the size gauge comprising: a first surface against which a first flat of the nut is placed; a second surface against which a second flat of the nut which is adjacent the first flat is placed, the second surface being at an angle of about 120 degrees to the first surface; and distance markings on the side gauge at or near the first surface, the distance markings providing an across flat measurement based on the length of the flat.

The size gauge may further comprise a first stud surface and a second stud surface at about 90 degrees to the first stud surface, and distance markings on the side gauge at or near the first stud surface providing a corresponding nut size for a stud based on the diameter of the stud.

In one embodiment, the size gauge is comprised of a ruler portion along which the first surface is located and a top portion along which the second surface is located. The distance markings are preferably located on the ruler portion.

In one embodiment, a slider may be located on the ruler portion, the slider being movable between a measuring position in which it is adjacent a third flat on the nut and identifies the across flat distance, and an open position in which it is away from the nut.

The size gauge may be foldable between a first position in which Imperial sizes are designated and a second position in which metric sizes are designated. Further, the size gauge may comprise a body portion and a telescoping portion, the telescoping portion being expandable from and retractable into the body portion to accommodate and measure the size of a nut located between the body portion and telescoping portion. In one embodiment, the size gauge includes an insert containing the distance markings, the insert being removable from the size gauge and replaceable with another which may designate a different measuring system.

In a further embodiment, the size gauge comprises a body portion, a sliding portion mounted on the outside of the body portion, the body portion and sliding portion defining a caliper a structure.

The size gauge may be of a size which corresponds to one of the following: credit card, business card, shirt pocket.

In one embodiment, the size gauge comprises a body portion contained and movable within a sleeve, the nut being accommodated in a variable size space formed between the body and the sleeve, and wherein the body portion has printed thereon designated markings for determining the nut size.

The nut gauge may be illuminated or made of glowing material for use in poor lighting conditions.

According to a further aspect of the invention, there is provided a size gauge for measuring the size of a nut and stud, the size gauge comprising: a first surface against which a first flat of the nut is placed; a second surface against which a second flat of the nut which is adjacent the first flat is placed, the second surface being at an angle of about 120 degrees to the first surface; a third surface against which a shaft of the stud is placed; a fourth surface against which the shaft of the stud is placed, the fourth surface being at an angle of about 90 degrees to the third surface; nut size distance markings on the size gauge at or near the first surface, the distance markings providing an across flat measurement based on the length of the flat; and nut size distance markings for the stud on the side gauge at or near the third surface.

According to yet a further aspect of the invention, there is provided a method of measuring the across flat distance of a nut, the method comprising: providing a size gauge having a first surface against which a first flat of the nut is placed, and a second surface against which a second flat of the nut which is adjacent the first flat is placed; configuring the first and second surfaces so that they defined an angle of about 120 degrees relative to each other; and forming distance markings on the side gauge at or near the first surface, the distance markings providing an across flat measurement based on the length of the flat.

The method may further comprise a third surface against which a stud shaft is placed, and a fourth surface against which the stud shaft is placed, configuring the third and fourth surfaces so that they defined an angle of about 90 degrees relative to each other, and forming distance markings on the side gauge at or near the third surface, the distance markings providing a nut size for the shaft based on the diameter of the shaft.

The invention is thus for a device and method whereby one flat of a hex nut can be measured so as to determine an across flat (AF) size. The nut and stud size gauge of the invention, which may also be referred to herein as the heavy hex gauge, therefore simplifies and more quickly facilitates the ability to determine the across flat size by simply measuring one flat of the hex nut.

The measurement of heavy hex or industrial size nuts and studs is currently carried out in standard fashion by a tool for measuring a hex nut size by the "Across the Flats" measurement referred to as "AF". This tool measures the distance from one flat edge of a nut to its opposing flat edge. Although this tool is measuring one flat, the expressed result is correlated to the AF nut size. So, a measurement of one flat that equals 1.547 or about 1 5/32" would correlate to a 2" nut and identify the measurement as 2".

The heavy hex gauge is a tool that is used to determine and identify the sizes of Heavy Hex studs and nuts. The design is most useful in finding sizes for the standard Heavy Hex sizes used in industrial applications. Usually, these sizes are of a nut size over 1" across and a stud size over ⅝" in diameter. The Heavy Hex Gauge of the present invention is preferably able to measure these standard sizes from a ⅝" stud to 4" stud and 1¹⁄₁₆" nut up to 6⅛" nut, although not limited to the sizes.

The technical field in which the large nut and stud sizes are used include but are not limited to large apparatus bolting, industrial fastening, structural steel fasteners, and Heavy Hex stud and bolt size measurement.

A nut typically comprises upper and lower surfaces, and six flats or flat edges which form a hexagon in shape.

A nut and stud gauge of the present invention may preferably have a square or 90 degree angle portion for measuring studs, and a substantially 120 degree angle portion for measuring nuts, in a manner which will be described more fully below.

Stud measurement: The square angle at the top end of the Heavy Hex Gauge is for measuring the end width of the stud. When the end of the stud is properly nested against the square end of the Heavy Hex Gauge the other side of the stud will line up within a tick mark range thus revealing the corresponding Heavy Hex Stud size. Next to this stud size is the corresponding nut size.

Nut Measurement: At the end of the Heavy Hex Gauge, there is a substantially 120° angle that allows the heavy hex gauge to nest against the nut, along two adjacent side edges. A measurement is taken from a single flat instead of measuring across the distance of the parallel flats. In this regard, it is the length of a single flat which is measured, and from which the across flat distance is calculated.

In use, a user can place the 120° angled end of Heavy Hex Gauge against the nut to measure and observe the tick marks on the area where the nut flat is touching the rule or gauge. At this point, there is a range of tick marks revealing the Heavy Hex nut size across flats. This is not a representation of the actual measurement. It is a corresponding measurement of the flat distance that an AF measurement would have. For example, a 2" nut has 6 nut flats that create the hexagon shape and each flat of the hexagon shape is 0.57735 in width. This width would be marked as 2", indicating the size of tool required to operate that specific nut.

Some of the technical issues involved in measuring nut sizes are set forth as follows:

(1) Nut sizes by standard are referred to by their across flat measurement or AF. This distance is easy to measure on an uninstalled nut. However, it is significantly more difficult to measure across the flats of an installed nut, because the stud projects through the center and makes it difficult to measure across the flats. When a nut is installed, most procedures will require that at least three threads of the stud extend above the top face or surface of the nut. These extending threads of the stud tend to block access for accurate measurement. The extending threads thus get in the way and the technician or operator may then need to visually guess or estimate the proper measurement, bend the ruler or use some form or procedures, usually not very adequate, to get an accurate measurement. Vernier calipers can reach across the flats without the stud getting in the way. However, they are usually too accurate as these tools measure in as small as 0.0001" of an inch increments.

(2) The standard set by ASME has a minimum and maximum size envelope of acceptance. That is to say that the maximum of a 2" AF nut would measure exactly 2" (2.000") but it has a minimum (yet acceptable and called a 2" nut) size of about 1¹⁵⁄₁₆" (1.938"). This under-sizing of the nut can be frustrating if it is measured with a pair of Vernier calipers. Vernier calipers are very precise as they measure in thousands of an inch and are commonly used by machinists and inspection personnel. If they are expecting a 2" nut, it will seem to be off from the industry standard as they measure and under-size that which may be expected.

(3) Heavy Hex Metric and Imperial (fraction) sizes as set by ASME, ANSI and ISO Common sizes are not what most would expect to find, particularly if it is an installed nut with the stud in the way. Therefore, it is not uncommon that: 1⁷⁄₁₆" gets misinterpreted as 1½" (as it is only ¹⁄₁₆" under); 1¹³⁄₁₆" gets misinterpreted as 1¾" (as it is only ¹⁄₁₆" over); 2¹⁵⁄₁₆" gets misinterpreted as 3" (as it is only ¹⁄₁₆ under); and 4⅝" gets misinterpreted as 4½" (as it is only ⅛" over).

(4) In order to accurately find the correct nut size, the technician may use a tape or ruler which has increments, for example, of 1⅛", ¹⁄₁₆", ¹⁄₃₂" or ¹⁄₆₄", with the assumption that the more ticks, the more accurate the measurement will be. However, this attempt at rigorous precision only serves to confuse the technician. There are about 20 standard Imperial sizes and/or 25 standard metric sizes, and the technician has to sift through all those tick marks to make an appropriate selection. Therefore, having a rule that only shows the Industry Standard Sizes makes for easier size measurement and identification.

(5) It is expensive and time wasting when an incorrect nut size has been determined. On a bridge, reactor or wind turbine, it may be a long climb up. The wrench or hydraulic wrench set-up may weigh 200 lbs. Also, a job may stop when the part of a job-scope requires that a nut be removed and has not been removed. This impacts the other workers, support, safety, maintenance, engineering, crane operators, spotters and assistants. The preparation that went into getting ready for the job, the crane rental and operator, build scaffolding, volumes of permitting and planning, are all negatively impacted. Further, work permits which may be time stamped may have to be reissued at the end of each shift. There is also is the job time line, which is now extended. As such, there is a loss of uptime which can potentially cost in the millions of dollars per day for some plants. It is therefore very important to get the measurement right the first time.

The nut and stud side gauge of the invention may provide a number of advantages in the ability to quickly and accurately measure and ascertain size. In one embodiment of the invention, the Heavy Hex Gauge only includes the heavy hex nut and stud sizes as standardized by industrial applications (ASME and ANSI). It does not include other sizes in-between as the other sizes only serve to confuse or complicate the determination of the actual heavy hex size.

The following advantages may also be prevalent:

(1) The Heavy Hex Gauge may also be expressed as a ruler showing all heavy hex sizes and all 16ths in imperial sizes or all metric Heavy Hex Sizes with millimeters to illuminate all standard and undersized sizes for viewing a full array of size selection.

(2) The Heavy Hex Gauge identifies a Heavy Hex nut as well as the corresponding Heavy Hex stud size and vice versa.

(3) The Heavy Hex Gauge may have a fold to advantageously invert the ticks so as to select from Imperial (fractions) to Metric.

(4) The Heavy Hex Gauge may have an overlay to convert metric to imperial sizes.

(5) The Heavy Hex Gauge's ergonometric design makes it a powerful promotional tool for private labeling by the manufactures of hydraulic torque and tension tools, bolt lubricant, stud and nut fasteners, sockets, wrenches and related equipment as they may advertise or brand the Heavy Hex Gauge with their own respective logo.

(6) There may be an extra space on the Heavy Hex Gauge for the purpose of displaying reference charts such as torque charts, sizes, friction coefficients, pressure targets, size and product selection guides.

(7) There may be a hole provided for a tether or lanyard, for convenient wearing or storage by the user.

(8) The Heavy Hex Gauge may help greatly to standardize the already determined common sizes, whether in Imperial or Metric sizes.

(9) The Heavy Hex Gauge will help to accurately reference a proper tool selection while nut manufacturers will be able to maintain a variance of acceptable inaccuracy.

(10) The heavy hex gauge of the invention has the ability to indicate tool size by measuring the length of one flat. This is not a measurement but a correlation to the AF measurement. In other words, the across flat distance is determined from the length of the flat and displayed on the gauge.

(11) Measuring from one side of the nut is useful for hard to get to fasteners or those in caustic or high heat applications where measuring both sides would be difficult.

There are therefore a number of advantageous effects which result from the present invention. For one thing, the method of measuring from one flat makes for an accurate method without having to work around the stud in the middle of the nut, which is more than likely to be in the way of securing a good and accurate measurement. Therefore, because it is a correlation, it is not necessary to change the standard measuring across the flats. By using the invention, the operator is still able to end up with an AF measurement. Furthermore, use of the invention allows for a quicker and less cumbersome method of determining a size.

An additional advantage of the nut and stud size gauge of the invention is that by identifying AF measurements this way, the required rule is physically smaller but remains accurate.

The nut and stud size gauge of the invention may come in any suitable size or shape. Some possible sizes which may be convenient are as follows:

Credit Card Size: this size easily fits into a wallet for those wallets which are designed to fit credit cards.

Business Card Size: this size may not fit into a wallet as well as a credit card size, but is a customary size to give contact information, and would thus be a convenient configuration for the size gauge.

Full size: this size may fit into, for example, a shirt pocket. If it is over 5", it may fall out from a shirt pocket more easily, so an optimal size in this context should preferably be selected.

Folded sizes: Credit card size (2"×3⅜") is 6¾" unfolded so it fits inside a wallet more easily when folded and can measure the full range of sizes when unfolded.

The nut and stud size gauge, or size gauge, may have a registration configuration. In this regard, a reference slide which marks the other side of the nut or stud, or start and end of a measurement, may be provided, and may be made of paper, tacky notes, clip slide, magnets, plastic clips or a sheath. One beneficial configuration is that of the caliper style. This would abut both angles of the nut on the flat hexagonal edge in order to complete the start and finish of the measurement. If the substrate material of the ruler is thin enough or the magnet is strong enough, a magnet may be used as a marker of the start or end of a measurement.

Registration may be used to mark either end and the tick marks on the ruler's straight edge are used to measure the start and end of a measuring.

As regards the tick markings, in accordance with one embodiment of the invention, only the heavy hex imperial sizes may be indicated. Heavy hex imperial sizes are indicated with fractions of an inch and inches in-between. In another version, only heavy hex metric sizes are indicated, and only heavy hex metric sizes are indicated with millimeters and centimeters in-between.

In one embodiment, there may be convertible tick marks. Convertible tick marks may be changeable and convertible, so that marks may be selectively changed from Imperial to metric and vice versa. Another embodiment of the invention facilitates changeability from Heavy Hex tick marks only to adding all tick marks in-between.

In a further embodiment, there may be changeable tick marks. Changeable tick marks provide a feature whereby a removable plate or tab lists a different tick set. As an example, a plate showing Imperial sizes might be removed and replaced with metric covers. Further, one tick mark set may be hidden by that of another until needed.

Convertible embodiments of the invention might be to have a fold whereby the Imperial size is on the outside. By inverting the fold, the metric sizes are then exposed and correctly in place. Further, the concept of convertibility might be employed by having Imperial sizes on one side of the ruler device and Metric on the other and simply turning the ruler over allows the change of the tick set to occur.

On a plastic ruler where colors are easy to identify, a translucent overlay could be used to hide or expose tick sets by using like colors.

DETAILED DESCRIPTION OF THE INVENTION

Reference is now made to the various drawings and illustrations which describe different embodiments and variations of the present invention.

Figure 1:
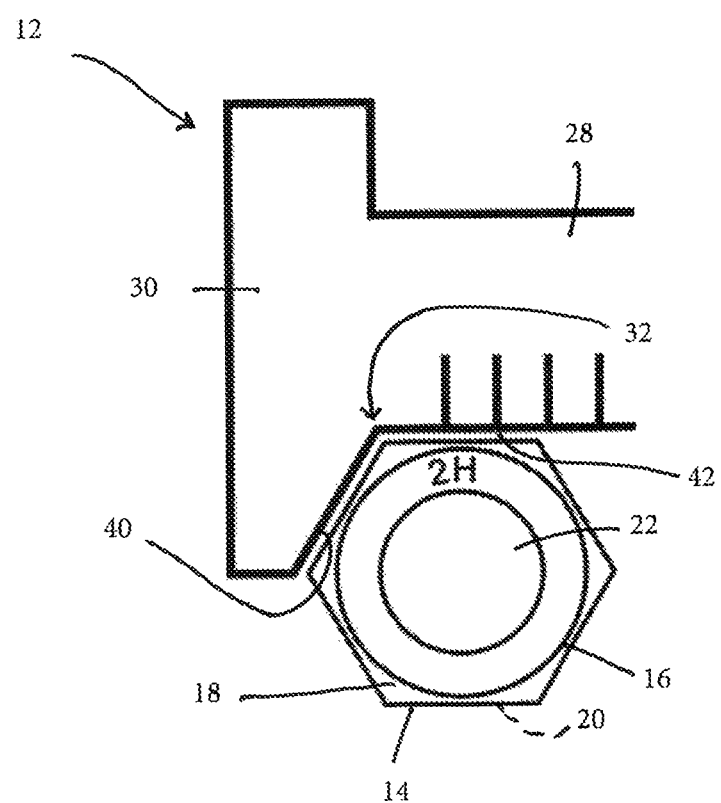
FIG. 1 shows a size gauge for a nut in accordance with one aspect of the invention.

FIG. 1 of the drawings shows a size gauge 12 for a nut 14. The nut 14 is of conventional hexagonal shape, with six flat side edges 16, an upper surface 18, and a lower surface 20. A central aperture 22 which is threaded receives a correspondingly threaded stud 26, such as of the type shown in FIG. 2 of the drawings. The size gauge 12 comprises an elongate ruler portion 28 and a top portion 30. On one side, the ruler portion 28 and top portion 30 define an angle of about 120 degrees at the point 32. Two flat edges 16 of the nut 14 abut against surface 40 and surface 42 of the size gauge 12 respectively. The angle between two flat edges 16 is also about 120 degrees so that it fits snugly in this section defined by the size gauge 12. Markings 46, or ticks, are located on the ruler portion 28.

The invention uses the measurement of a single flat as a method of arriving at the across flats measurement. This may be calculated as the perimeter divided by six, which is equivalent to one flat. The measurement is then correlated to the industry standard across flats expression. The tick marks are then shown for each and only the industry standard heavy hex sizes. As such, it will be appreciated that the markings and numbers on the ruler portion 28 do not measure the length of the flat 16 which abuts against it, but uses that length to provide the user with the across flat measurement. The user will thus, by measuring the distance of one flat, be provided with the across flat dimension so that an appropriate tool suitable for that particular nut can be selected to either tighten or loosen the nut, as may be appropriate.

Figure 2:
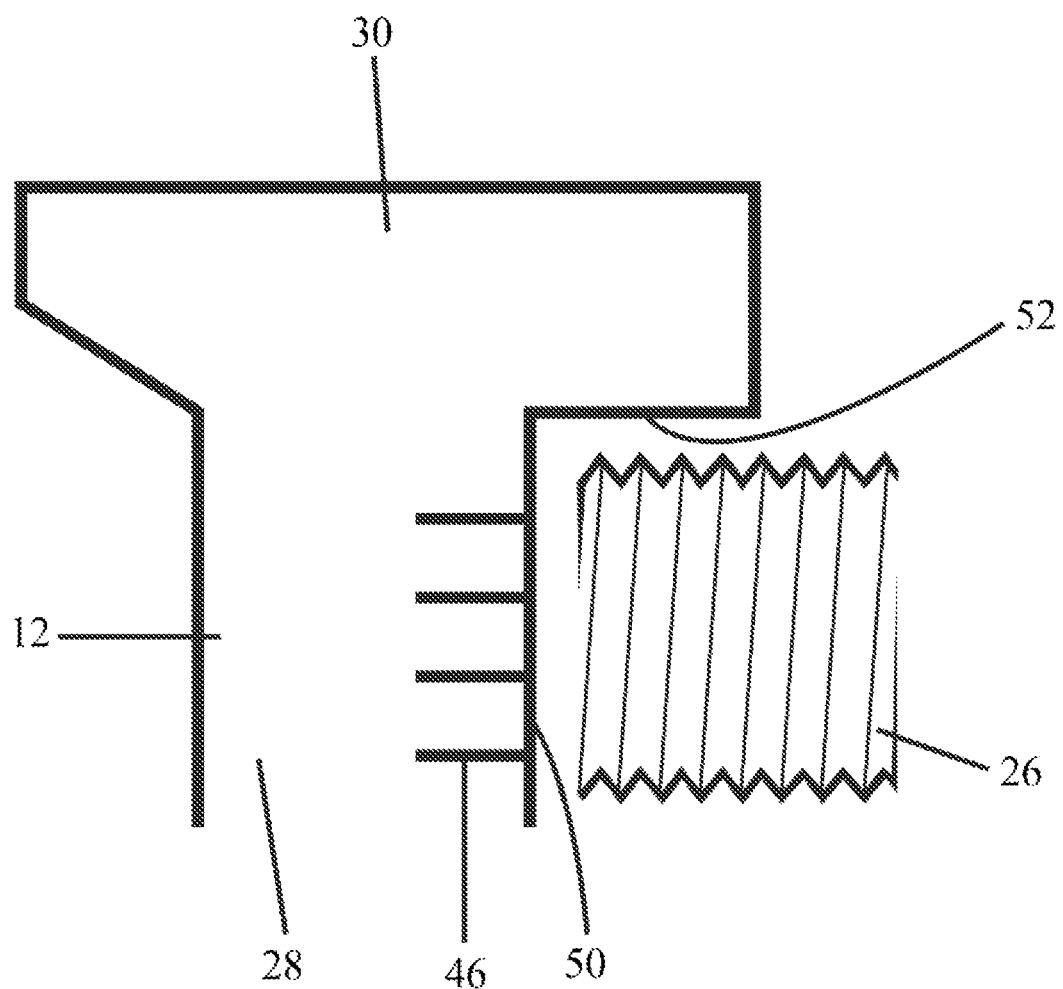
FIG. 2 shows a size gauge for a stud in accordance with one aspect of the invention.

FIG. 2 shows the size gauge 12, where the ruler portion and the top portion 30 have surfaces 50 and 52 which are generally at right angles to each other. A stud 26 which abuts these surfaces 50 and 52 has a diameter which can be read off on the ruler portion 28. As previously described with respect to a nut 14, the reading provided is not the actual diameter of the stud 26, but would provide the corresponding standard stud size, or nut size for that stud. In this embodiment of the invention, the tick marks, or markings 46, are only the industry standard heavy hex sizes.

Figure 3B:
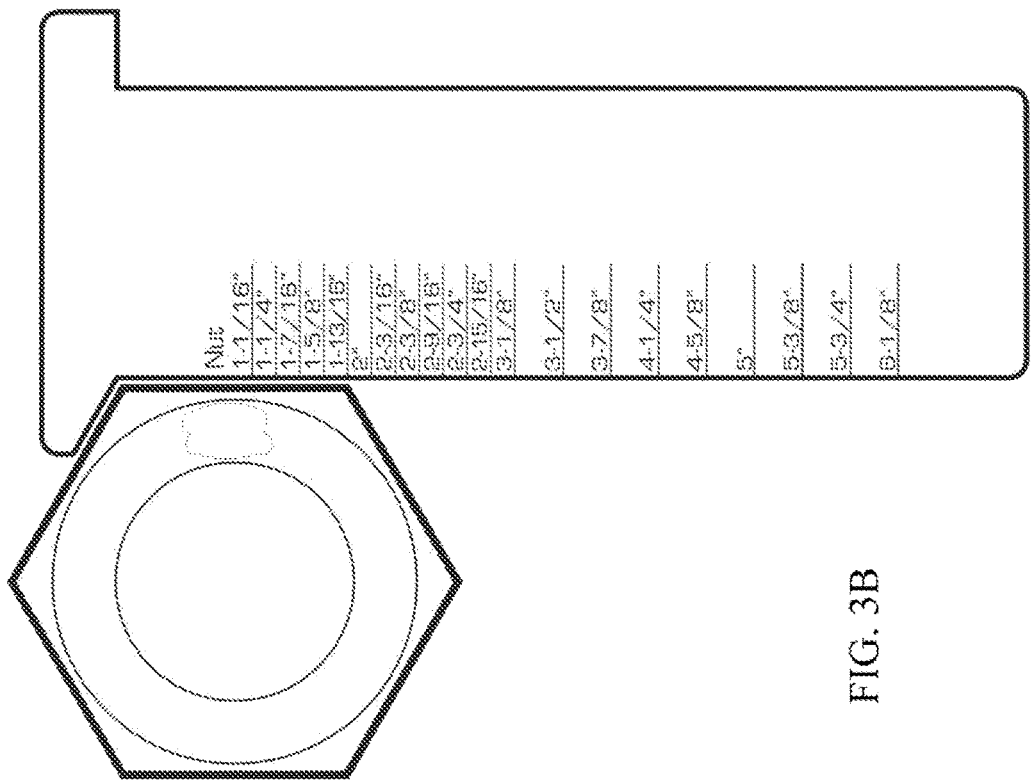
FIGS. 3A and 3B show different embodiments of a size gauge for a nut.
Figure 3A:
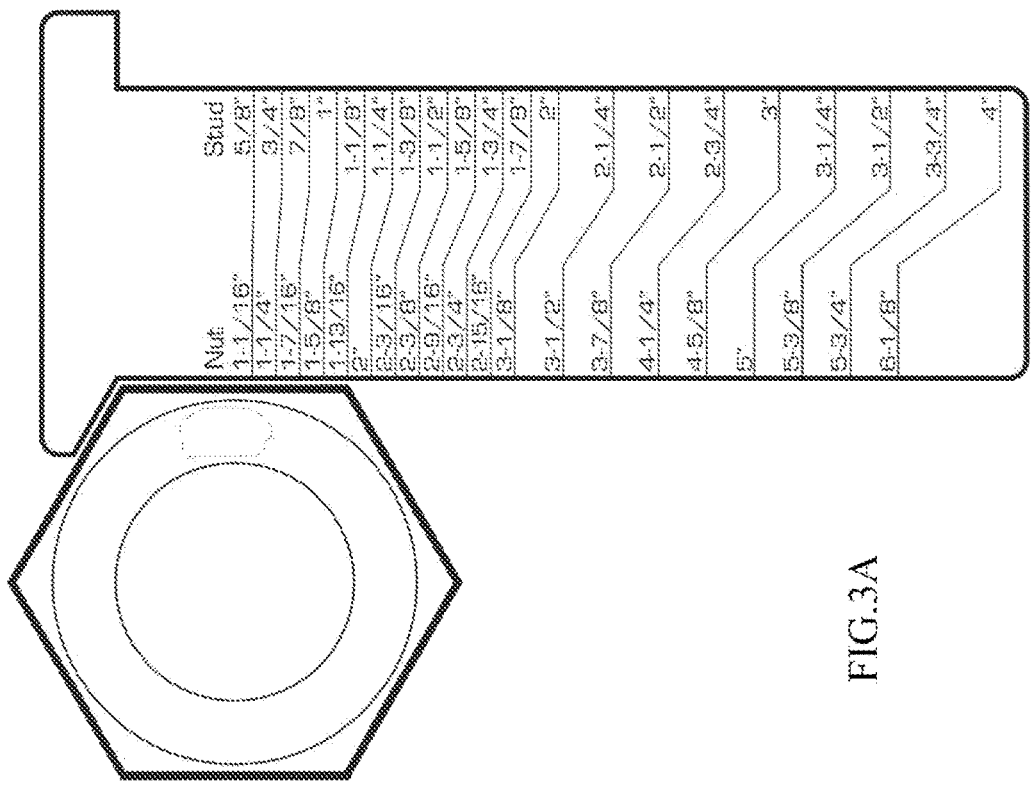
Figure 4B:
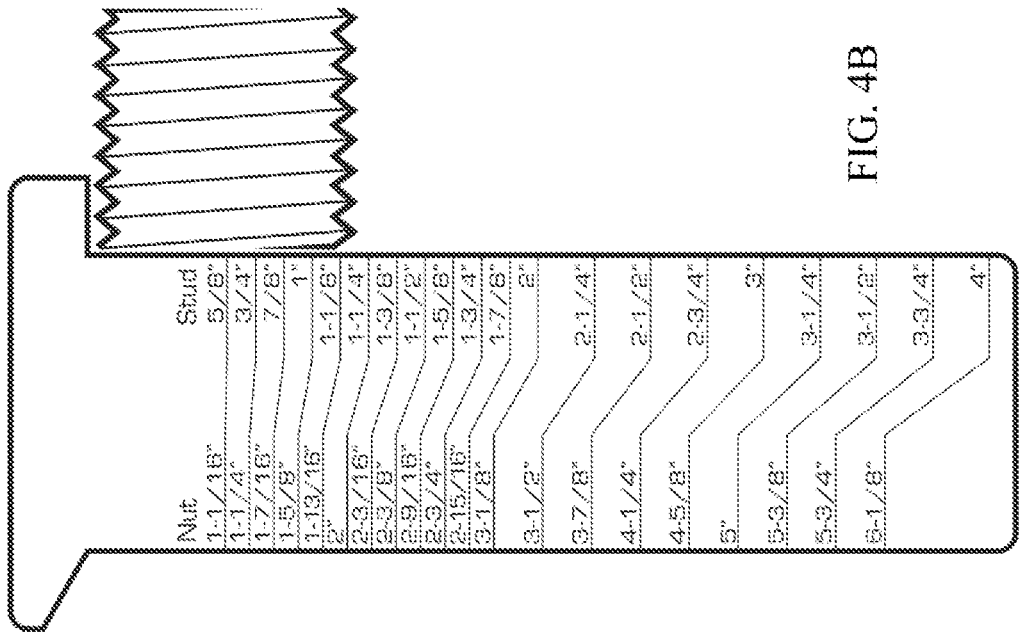
FIGS. 4A and 4B show different embodiments of a size gauge for a stud.
Figure 4A:
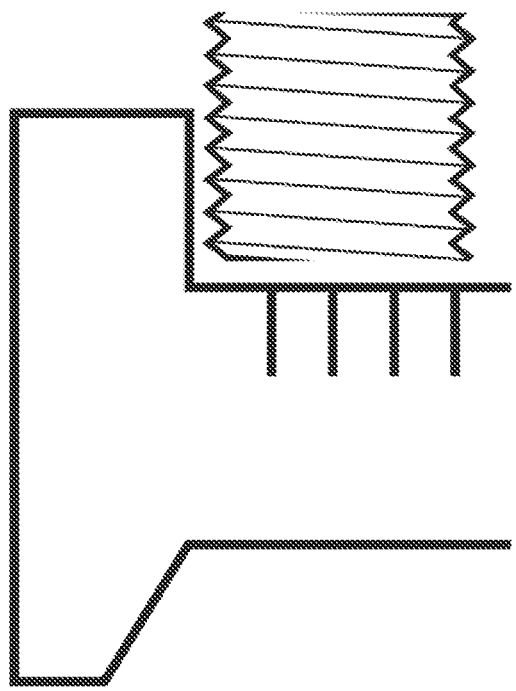

Reference is made to FIGS. 3A and 3B of the drawings. These figures show a size gauge 12 and nut adjacent thereto, with an actual number of markings and ticks down the side of the ruler portion of the size gauge. With the nut abutting the size gauge as shown, the length of the flat adjacent the ruler corresponds with a number, in this case 1¹³⁄₁₆", which is not the length of the flat, but the across flat measurement of the nut 14. FIGS. 4A and 4B show the same size gauge 12, but used in relation to the stud. The measurement provided is the stud size.

Figure 5A:
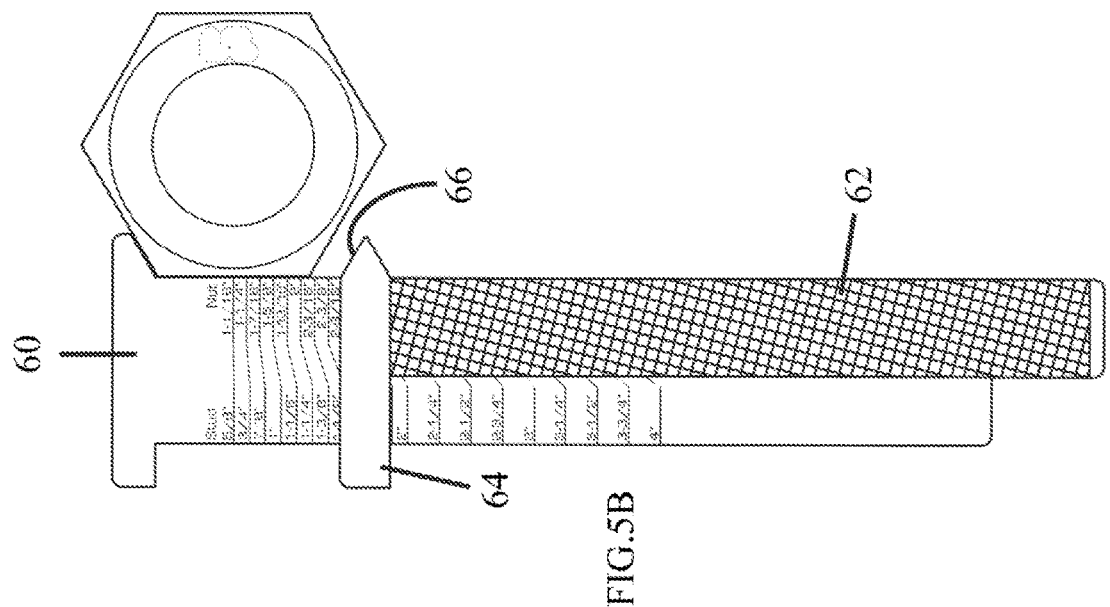
FIGS. 5A and 5B show a size gauge for a nut including a slider.
Figure 5B:
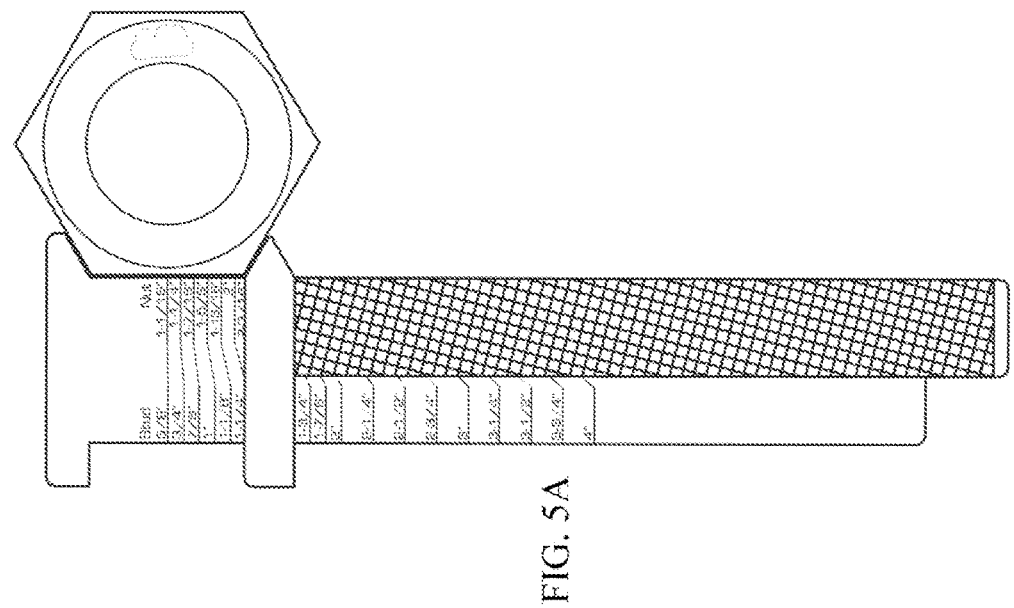

FIGS. 5A and 5B show a further embodiment of the invention comprising a size gauge 60 having a preferably magnetic slider 62 attached to a ferrous metal heavy hex gauge, and which can be used as a registration slider. The magnet slider 62 has at the top thereof a marking component 64 was a surface 66 which is approximately 120 degrees when measured against the side of the ruler portion. FIG. 5A shows the nut nestled against the ruler portion and top portion, with the marking component 64 spaced away, while FIG. 5B shows the condition where the magnetic slider 62 has been moved towards the nut so that the surface 66 is directly adjacent a flat. In this way, the across flat measurement can be read off on the ruler, as described above, in this embodiment underscored by the marking component 64 for easier reading.

Figure 6B:
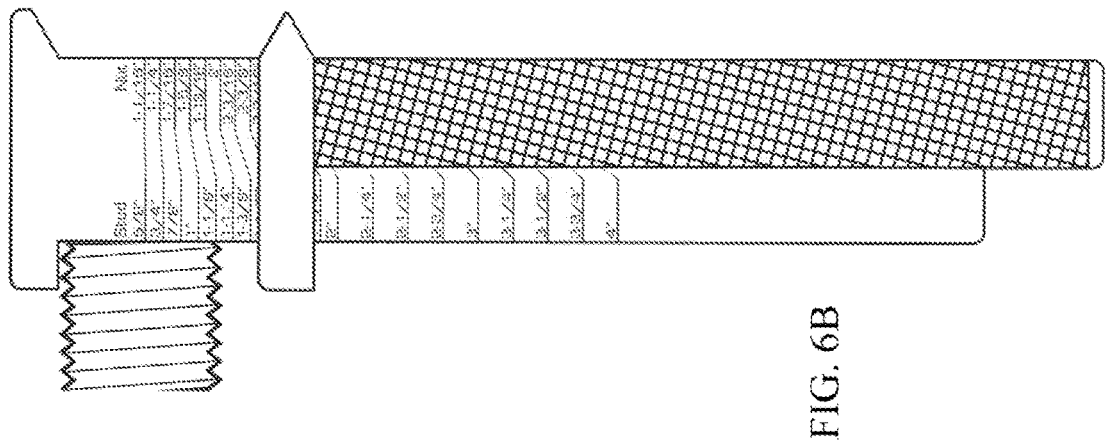
FIGS. 6A and 6B show a size gauge for a stud including a slider.
Figure 6A:
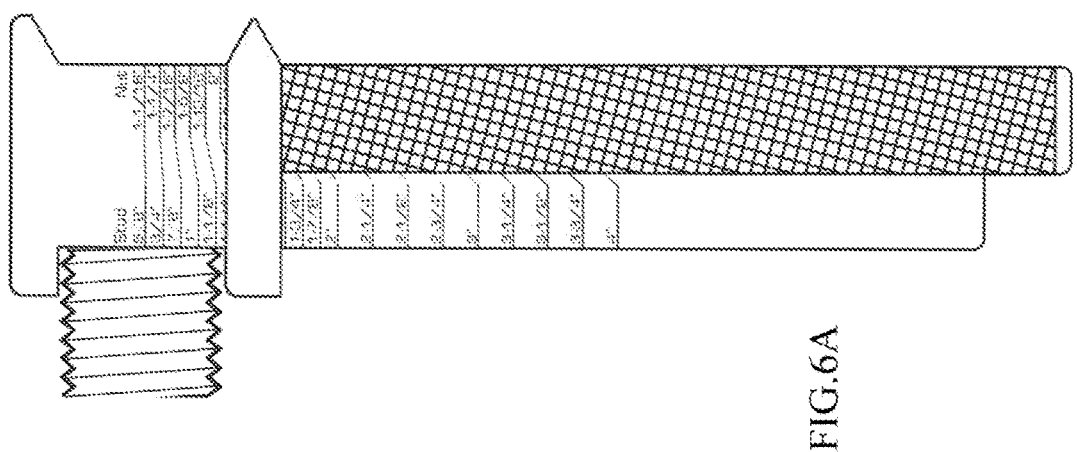

FIGS. 6A and 6B show a device similar to that in FIGS. 5A and 5B, but wherein the size gauge is measuring a stud on its opposing edge where the angle with the top portion is 90 degrees. Once more, the measurement provided on the ruler is the stud size.

Figure 7A:
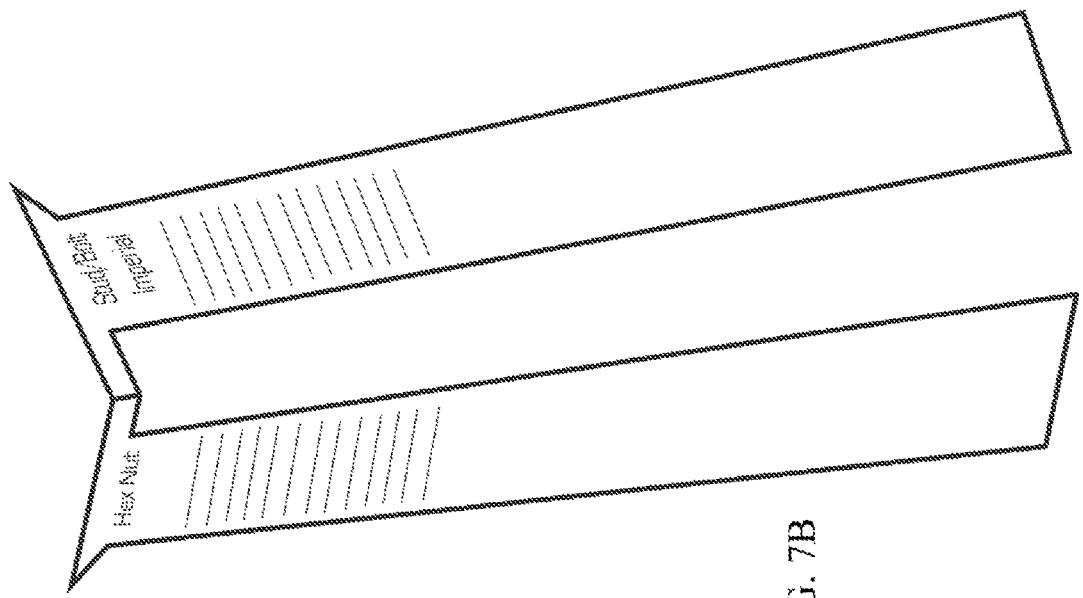
FIGS. 7A and 7B show a folding size gauge in a partially unfolded and folded position respectively.
Figure 7B:
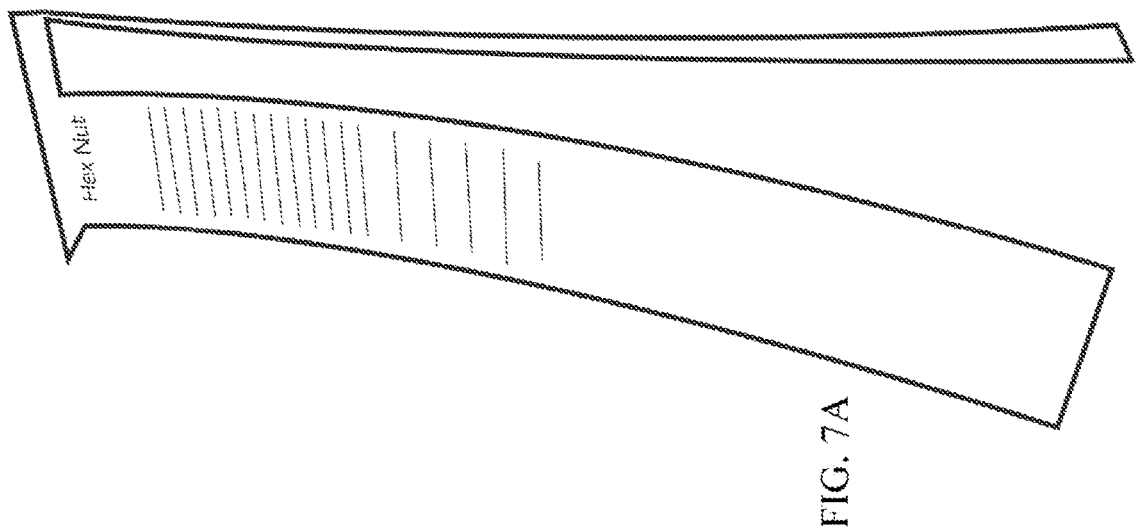

FIGS. 7A and 7B show a folding size gauge in accordance with an aspect of the invention. The size gauge in this embodiment is configured with a fold on the top portion. When folded in half, the size gauge of the invention can show a different set of tick marks. For example, the user might choose Imperial sizes, and then by appropriate folding, show metric or other size measurements.

Figure 8B:
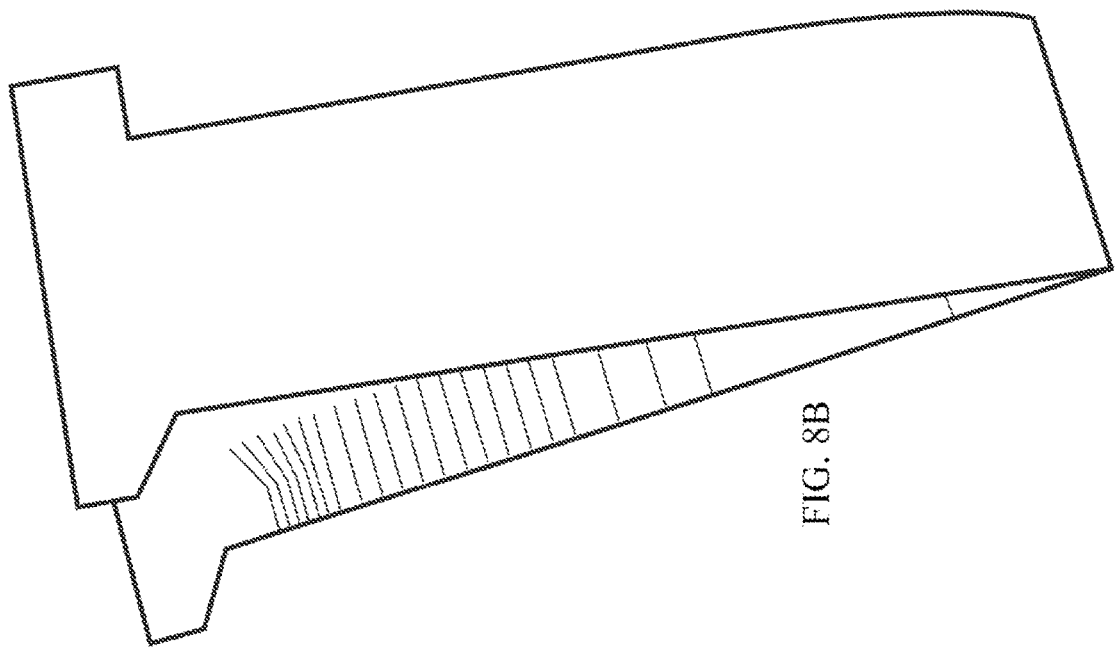
FIGS. 8A and 8B show a folding size gauge in another embodiment with the fold at the bottom.
Figure 8A:
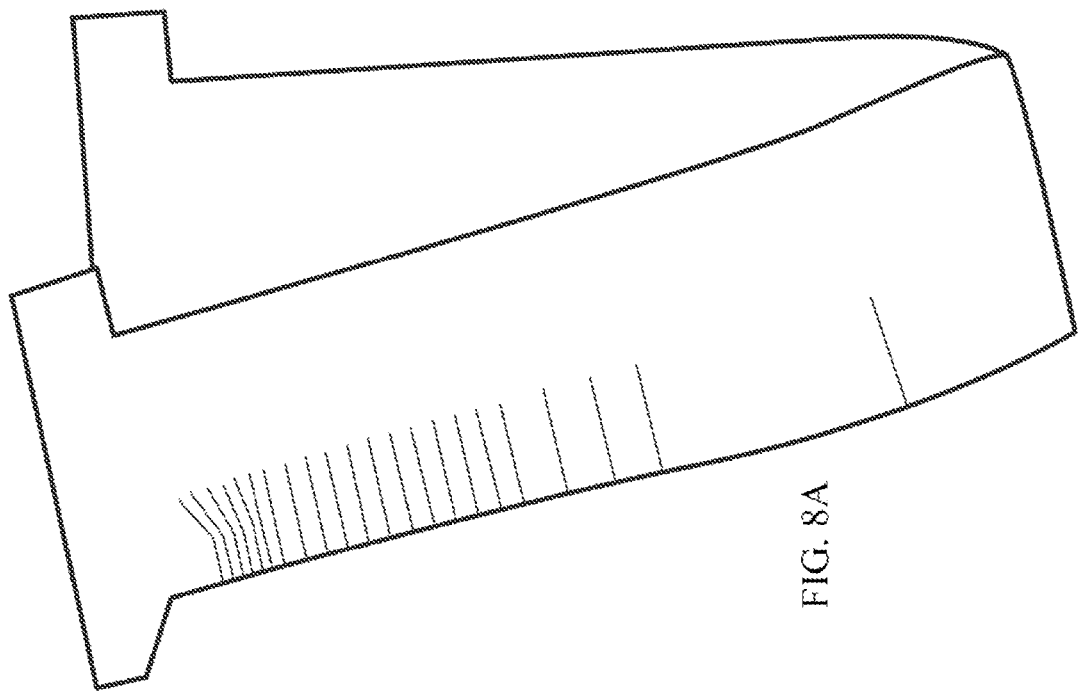

FIGS. 8A and 8B show a further aspect of the size gauge, also of the folding type, but wherein the fold is located at the bottom of the ruler portion.

Figure 9A:
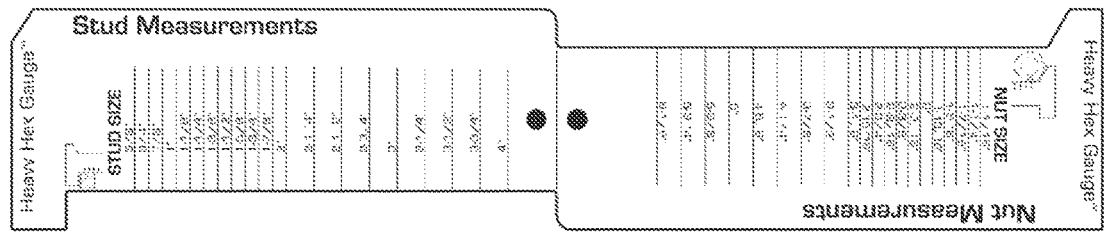
FIGS. 9A, 9B and 9C show an embodiment of the invention including a registration slider.
Figure 9B:
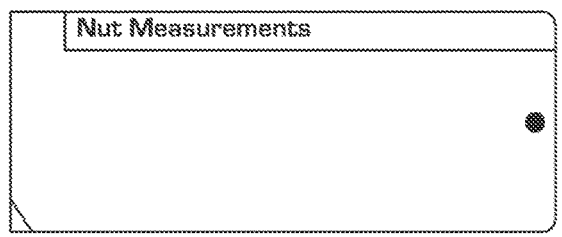
Figure 9C:
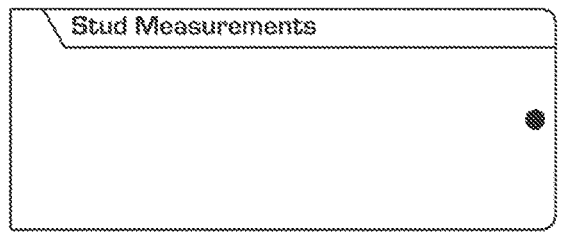
Figure 10A:
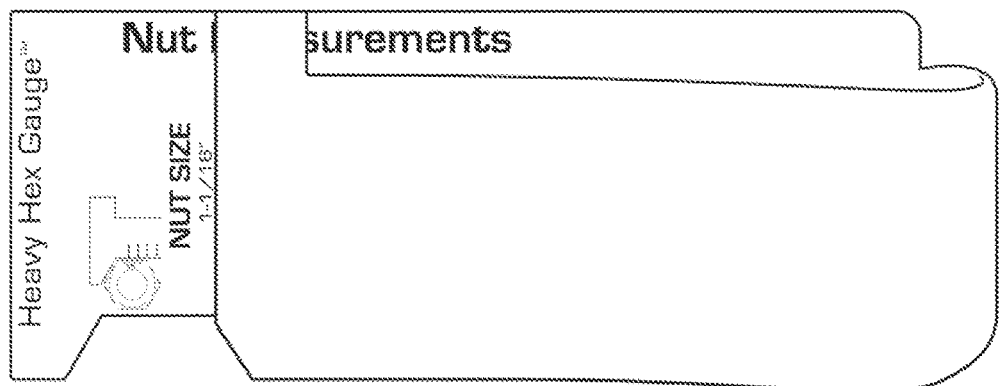
FIGS. 10A, 10B and 10C show an embodiment of the invention including a foldable flap to measure both a nut and stud respectively.
Figure 10B:
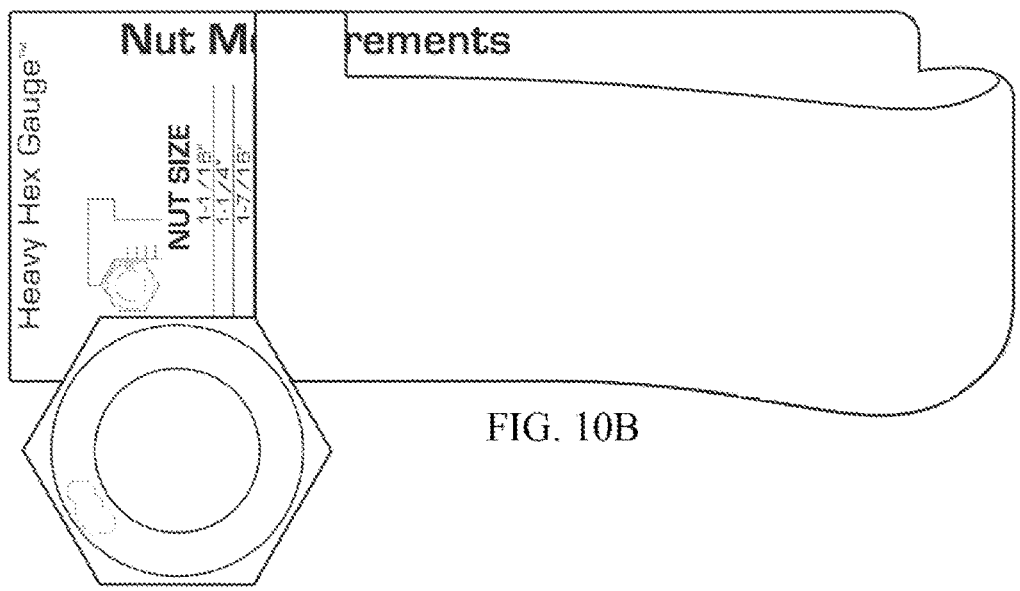
Figure 10C:
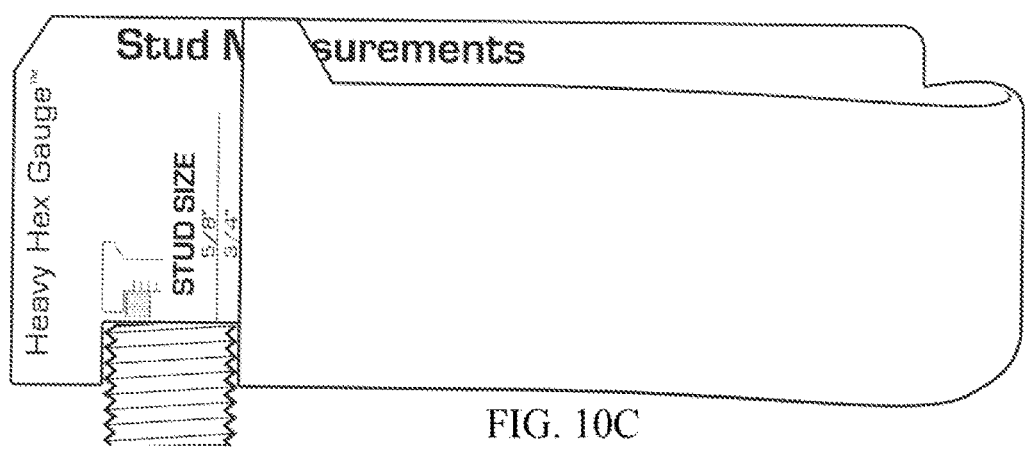

With reference to FIGS. 9A, 9B and 9C, a further embodiment is shown which can bend over or fold to form a registration slider. FIG. 9A shows the device unfolded, while FIGS. 9B and 9C show the device folded, indicating one side for nut measurement and the other for stud measurement. FIGS. 10A, 10B and 10C show how the device may be folded or bent. FIG. 10A shows folding for a nut, with FIG. 10B measuring the nut size. FIG. 10C shows the same size gauge measuring the stud size. Once more, it is to be noted that the measurements read off on the ruler portion are not the actual length or diameter of the nut, but rather the across flat, as well as the stud size.

Figure 11A:
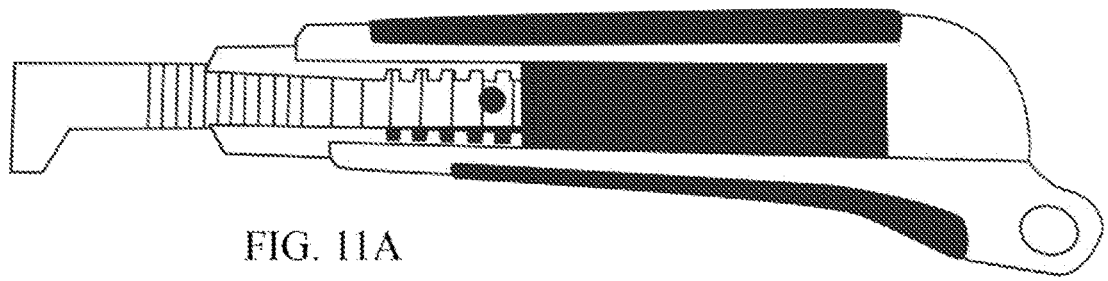
FIGS. 11A, 11B and 11C show an embodiment of the invention with a retractable component.
Figure 11B:
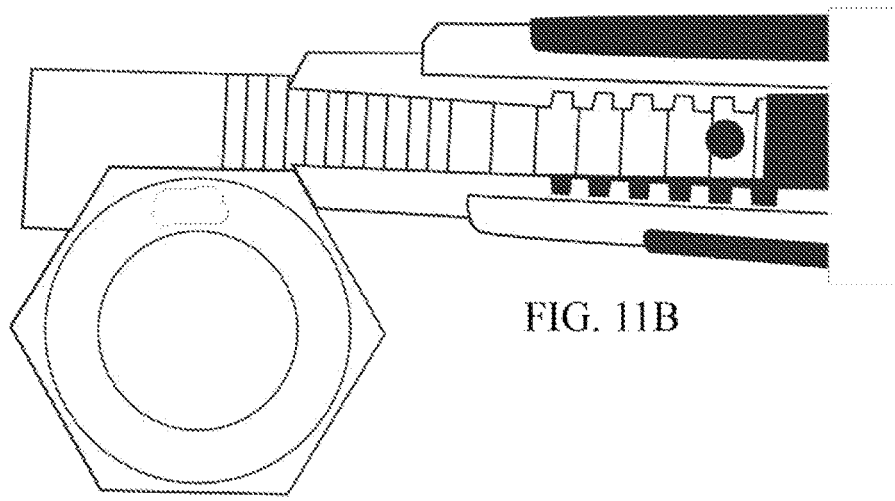
Figure 11C:
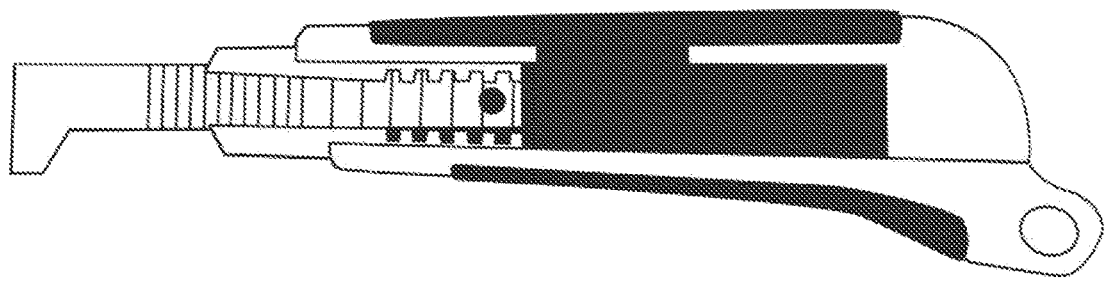
Figure 11C:
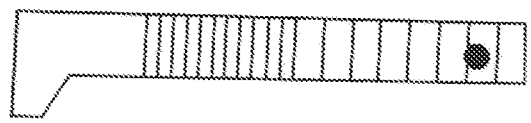

FIGS. 11A, 11B and 11C show a further version of the size gauge of the invention which is a durable and has a retractable heavy hex gauge that incorporates the ability to swap out tick mark placards so as to reference, for example, either Imperial or metric measurement sizes as desired by the operator.

Figure 12A:
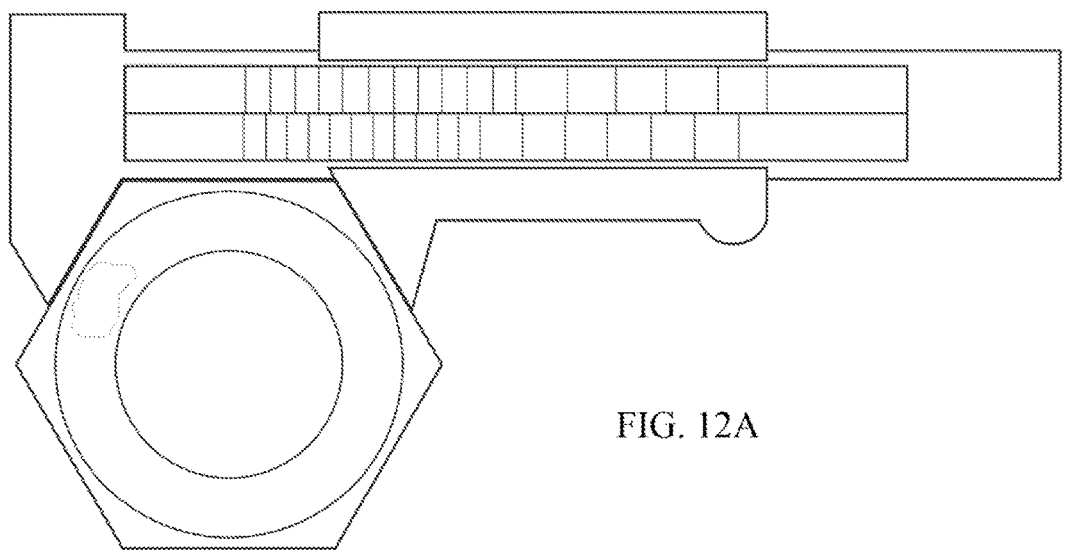
FIGS. 12A and 12B show an embodiment of the invention with a sliding component for a nut and a stud respectively.
Figure 12B:
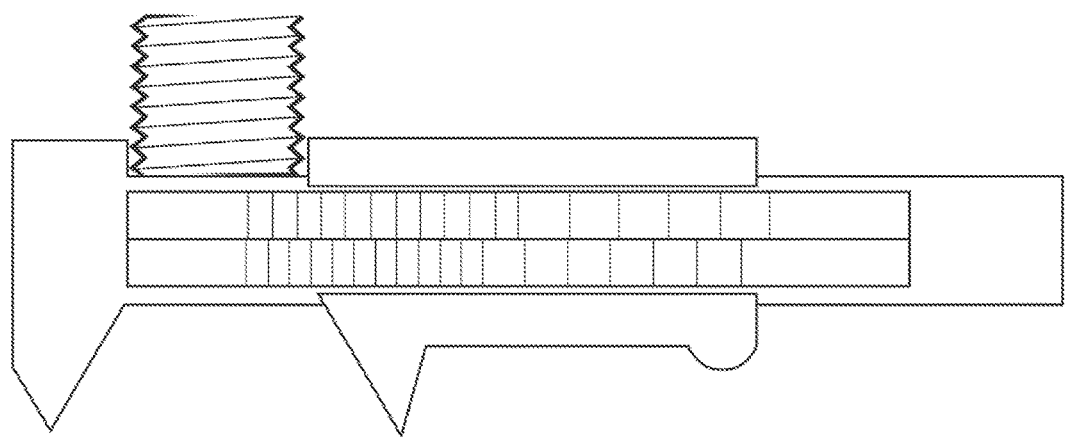

FIGS. 12A and 12B shows a size gauge of the invention configured in a manner somewhat similar to a vernier caliper. One of these figures shows measurement of a nut, the other of a stud. Again, this differs from a conventional vernier caliper by taking the measurement of one flat (FIG. 12A) to provide the across flat dimension, or the diameter of the stud (FIG. 12B) to provide the hex nut or stud size. This embodiment may incorporate the use of an interchangeable tick placard to change, for example, between imperial and metric according to the needs of the user.

Figure 13A:
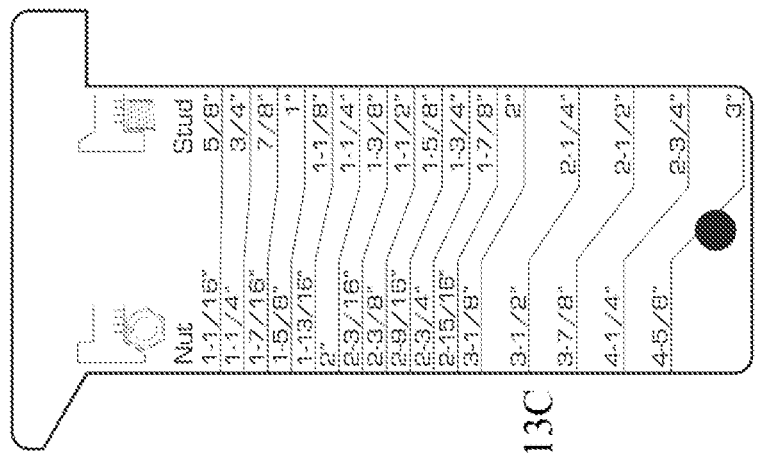
FIGS. 13A, 13B and 13C show embodiments of the invention in different selected sizes.
Figure 13B:
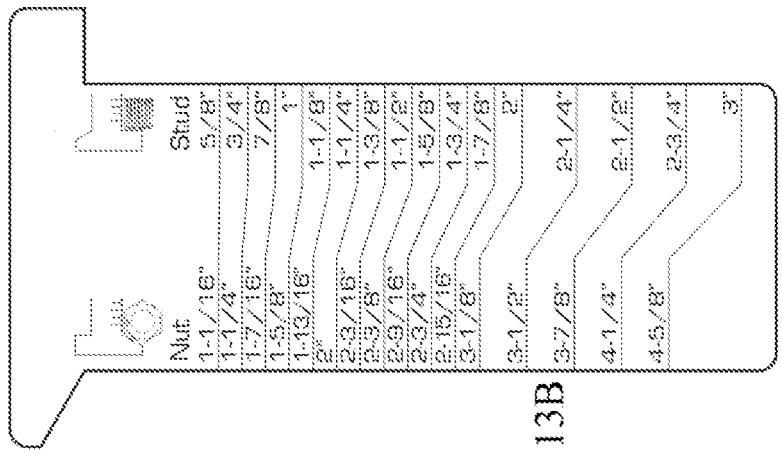
Figure 13C:
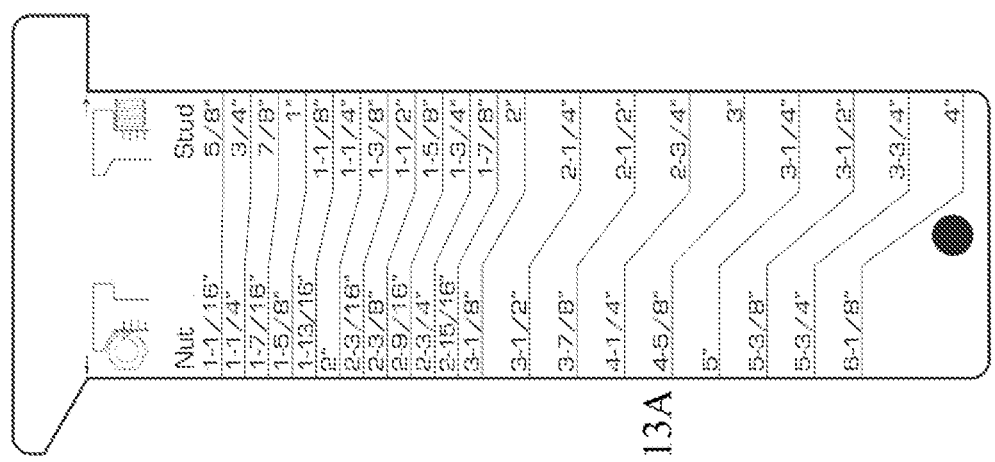

FIGS. 13A, 13B and 13C show a size gauge of the invention in different sizes. There may thus be provided a credit card size (13A) for possible use in a wallet, a business card size (13B) for use in any receptacle suitable for holding a business card, and a shirt pocket size (13C) for a shirt pocket but not too long so as to be constantly falling out. As regards the shirt pocket size, it is to be noted that workers may often be bending over and reaching, so a preferred size would ensure that the size gauge is substantially contained within the pocket to reduce the chances of falling out.

Figure 14B:
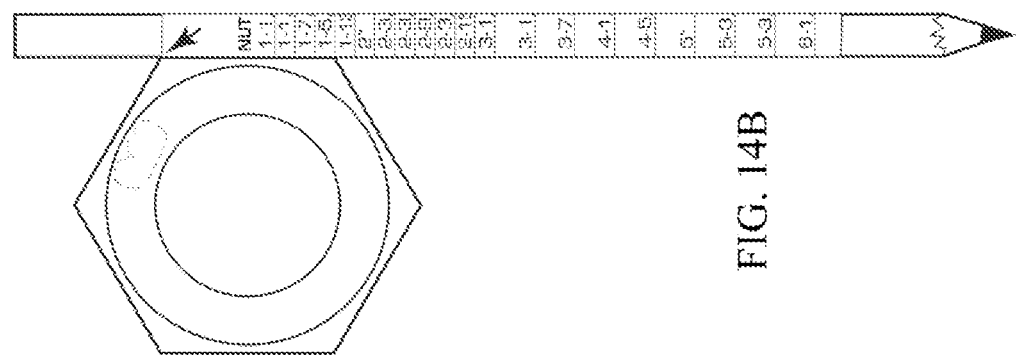
FIGS. 14A and 14B show an embodiment of the invention with a pencil or marker configured for measurement.
Figure 14A:
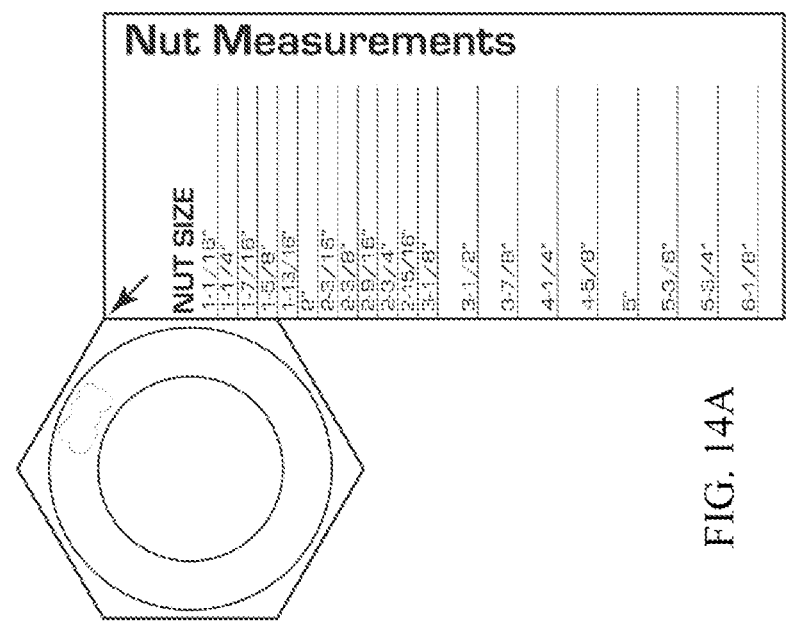

FIGS. 14A and 14B show a further embodiment, such as markings on a pencil or marker, with a measurement start point where the edge of one flat on a nut is registered. This flat straight edge can be used in a number of different styles, such as a construction pencil with measurements as illustrated. An arrow may be provided to easily identify the measurement start point. One side of the pencil or other such device may be for a nut, while the other is for a stud. Such an embodiment may be useful for advertising giveaways, and may include a brand name.

Figure 15:
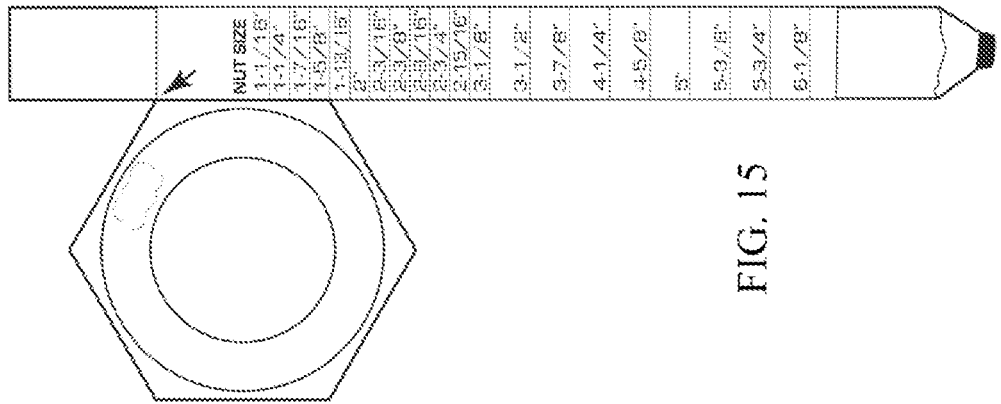
FIG. 15 shows an embodiment of the invention as part of a business card configured for measurement.

FIG. 15 shows a size gauge which may be in the form of a business card, also indicating a start point in a corner of the business card, and measuring the length of the flat of the nut as illustrated in this figure. The measurement provided is not the length of the flat itself, but rather the across flat distance.

Figure 16B:
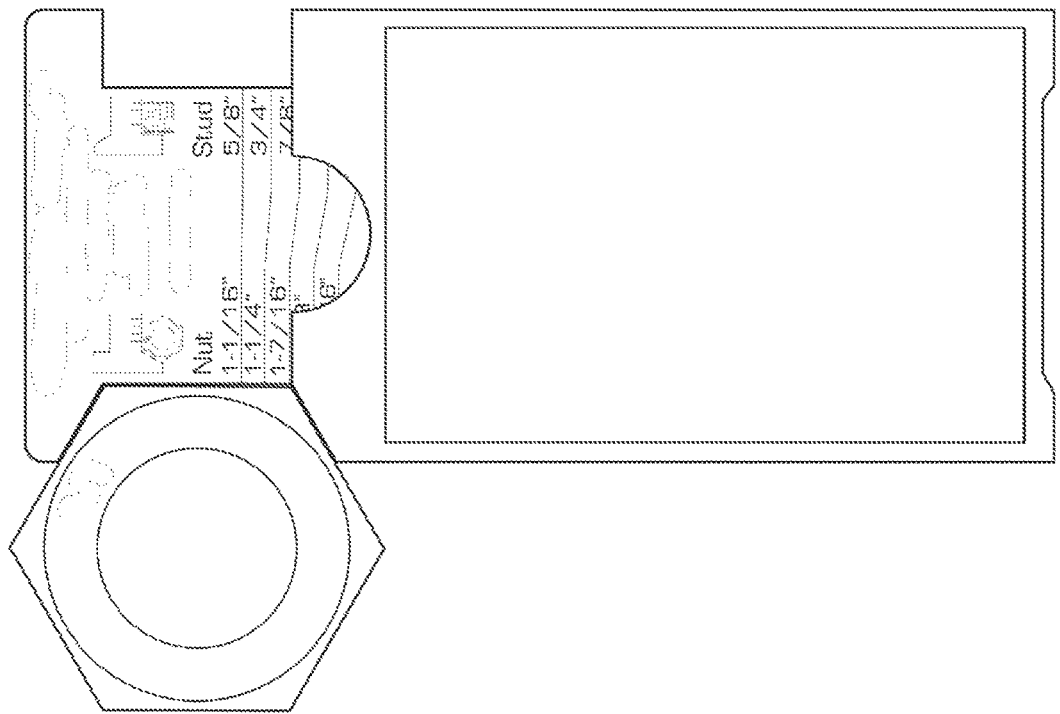
FIGS. 16A and 16B show an embodiment of the invention for a nut and stud respectively including a storage sleeve.
Figure 16A:
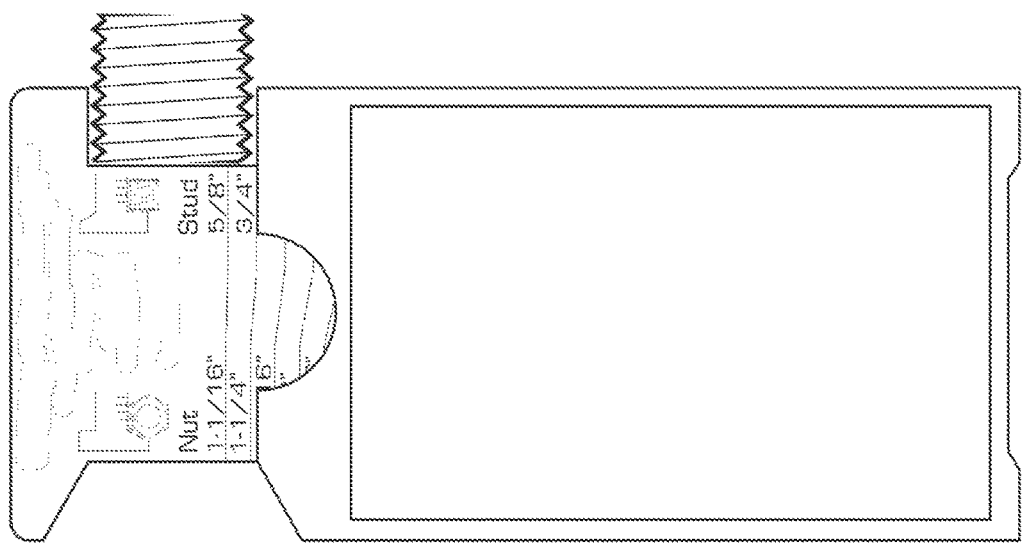

FIGS. 16A and 16B illustrate the embodiment of a size gauge of the invention which may be slidably received within a storage sleeve. By moving the size gauge in and out of the storage sleeve, one side thereof (FIG. 16A) will receive a selected nut, determining its across flat dimension, while the other side thereof (FIG. 16B) will receive a selected stud.

Figure 17:
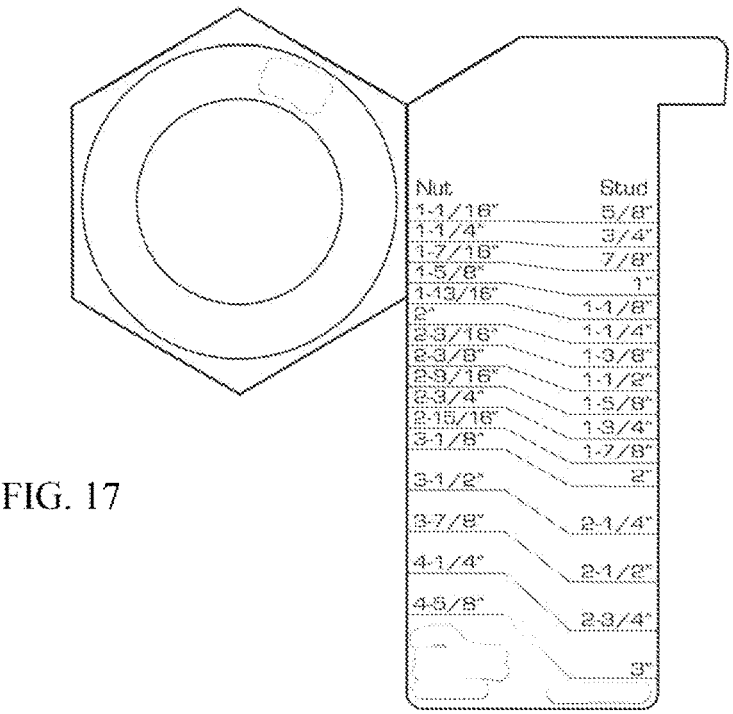
FIG. 17 shows an embodiment of the invention where the corner of a size gauge registers with the corner of a nut.
Figure 18:
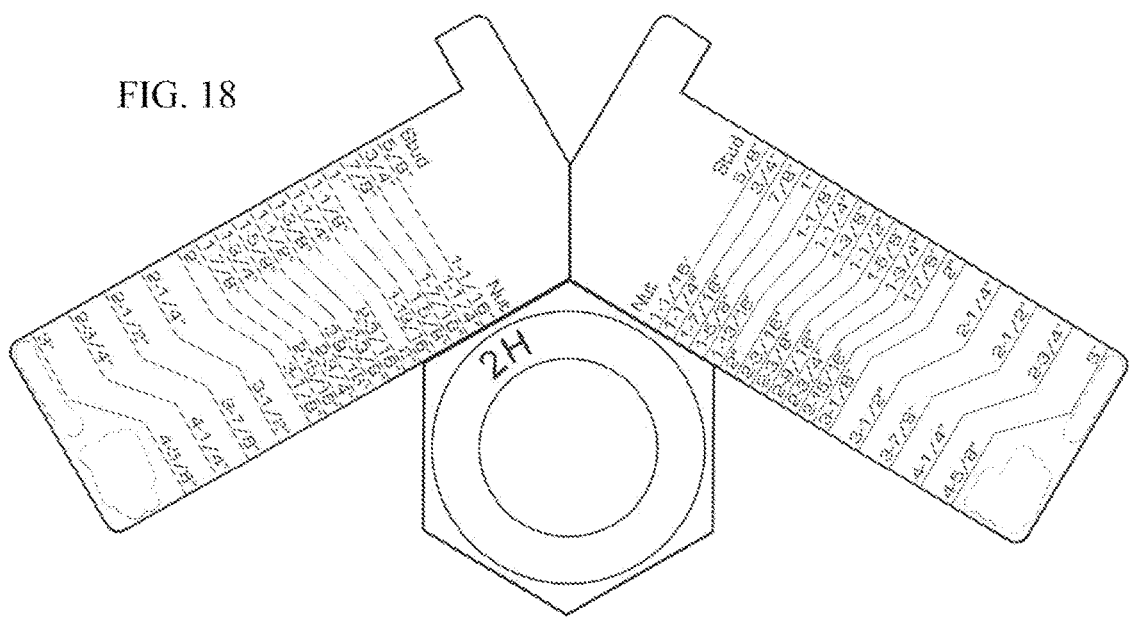
FIG. 18 shows a further embodiment of the invention similar to FIG. 17 but unfolded to measure two sides of the nut.

FIGS. 17 and 18 shows a size gauge which can be folded. Different mechanisms for measurement are provided. In FIG. 17, the flat side of the night is measured from a start point along one edge of the size gauge. FIG. 18 shows the size gauge unfolded, providing the 120 degree angle for receiving two adjacent flat edges of the nut.

Figure 19:
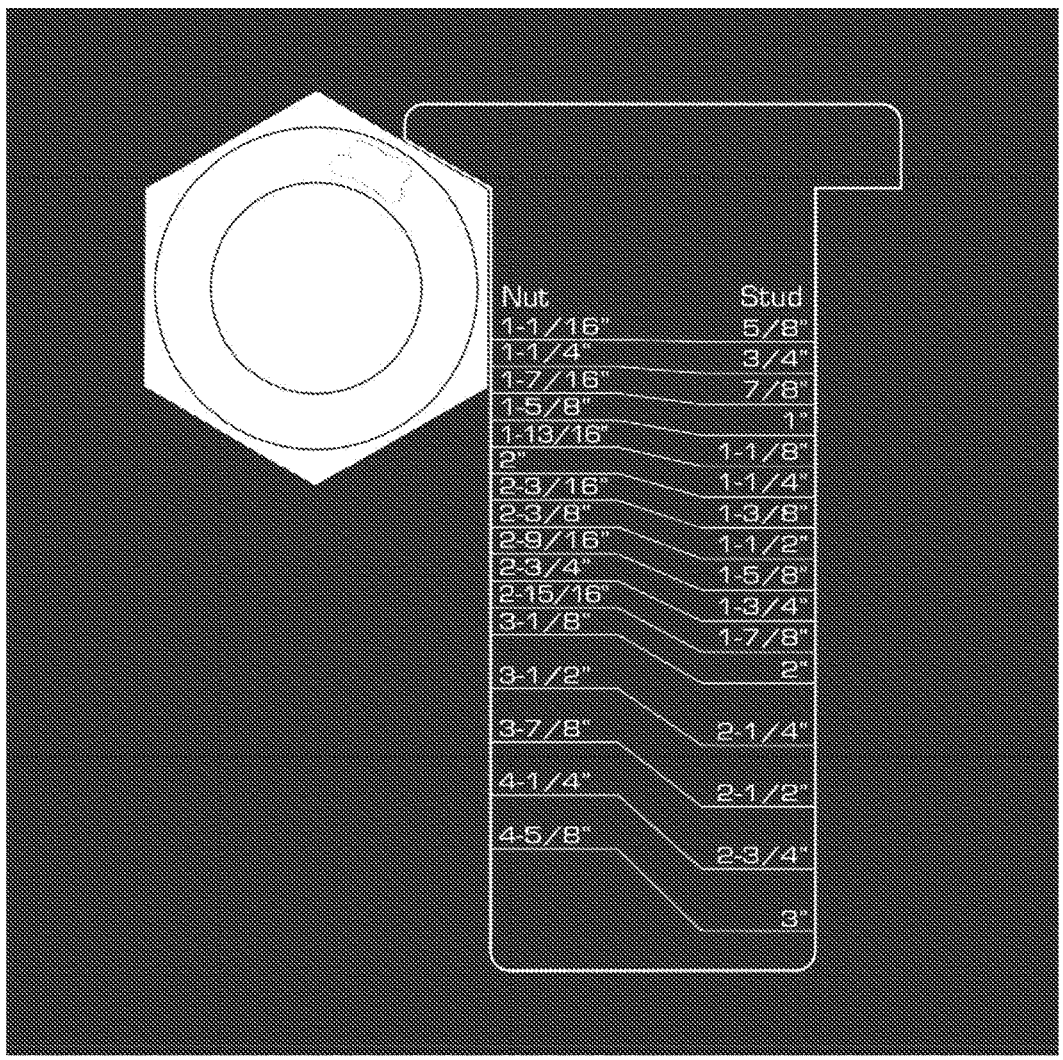
FIG. 19 illustrates an embodiment of the invention which may be illuminated for nighttime usage.

FIG. 19 illustrates a size gauge in accordance with the invention which facilitates night time illumination by the use of glow paint, phosphorus etching, or lighted sides on a Luxan, plexiglass or acrylic type material. These are examples of materials only, and the invention should not be considered as being limited to any particular type of material.

It will be appreciated from the above description and the accompanying illustrations that the invention provides a unique and effective mechanism for measuring nuts and studs, especially when they have been installed. It is particularly difficult to measure the across flat distance of a nut when a large stud has been received and threaded the within the aperture of the nut. The present invention enables the nut size to be determined, therefore, by measuring a much more accessible flat of the nut, and providing an algorithm or extrapolation based on the length of the flat to furnish the user with the nut size. Similarly, the diameter of the stud can be measured, and based upon such measurement, the stud size for that stud, or appropriate nut size, is provided.

The invention is a simple, and easily storable device which has many advantages for on-site construction, and as mentioned above, has the potential to enhance the performance of a job, and to prevent possible downtime, which can become very expensive.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A size gauge for a nut having flat edges, the size gauge comprising:
    a first linear surface against which a first flat of the nut is placed, the first linear surface having a length which is greater than the entirety of the first flat;
    a second linear surface adjacent the first linear surface against which a second flat of the nut which is adjacent the first flat is placed, the second linear surface being at an angle of about 120 degrees to the first linear surface; and
    distance markings on the size gauge at or near the first linear surface, the distance markings providing an across flat measurement of the nut based on the length of the flat of the nut.

2. A size gauge as claimed in claim 1 further comprising a first stud surface and a second stud surface at about 90 degrees to the first stud surface, and distance markings on the side gauge at or near the first stud surface providing a corresponding stud or nut size for a stud based on the diameter of the stud.

3. A size gauge as claimed in claim 1 comprising a ruler portion along which the first surface is located and a top portion along which the second surface is located.

4. A size gauge as claimed in claim 3 wherein the distance markings are located on the ruler portion.

5. A size gauge as claimed in claim 3 further comprising a slider on the ruler portion, the slider being movable between a measuring position in which it is adjacent a third flat on the nut and identifies the across flat distance, and an open position in which it is away from the nut.

6. A size gauge as claimed in claim 1 foldable between a first position in which Imperial sizes are displayed and a second position in which metric sizes are displayed.

7. A size gauge as claimed in claim 1 wherein the size gauge comprises a body portion and a telescoping portion, the telescoping portion being expandable from and retractable into the body portion to accommodate and measure the size of a nut located between the body portion and telescoping portion.

8. A size gauge as claimed in claim 1 comprising an insert containing the distance markings, the insert being removable from the size gauge and replaceable with another which may designate a different size measuring system.

9. A size gauge as claimed in claim 1 comprising a body portion, a sliding portion mounted on the outside of the body portion, the body portion and sliding portion defining a caliper a structure.

10. A size gauge as claimed in claim 1 configured so as to be of a size corresponding to one of the following: credit card, business card, shirt pocket.

11. A size gauge as claimed in claim 1 comprising a body portion contained and movable within a sleeve, the nut being accommodated in a variable size space formed between the body and the sleeve, and wherein the body portion has printed thereon designated markings for determining the nut size.

12. A size gauge as claimed in claim 1 comprised of illuminated or glowing material for use in poor lighting conditions.

13. A size gauge for measuring the size of a nut and stud, the size gauge comprising:
 a first surface against which a first flat of the nut is placed;
 a second surface against which a second flat of the nut which is adjacent the first flat is placed, the second surface being at an angle of about 120 degrees to the first surface;
 a third surface against which a shaft of the stud is placed;
 a fourth surface against which the shaft of the stud is placed, the fourth surface being at an angle of about 90 degrees to the third surface;
 nut size distance markings on the side gauge at or near the first surface, the distance markings providing an across flat measurement based on the length of the flat; and
 stud size distance markings for the stud on the side gauge at or near the third surface.

14. A size gauge as claimed in claim 13 comprising a ruler portion along which the first and third surfaces are located and a top portion along which the second and fourth surfaces are located.

15. A size gauge as claimed in claim 14 wherein the distance markings are located on the ruler portion near the first and third surfaces thereof.

16. A method of measuring the across flat distance of a nut, the method comprising:
 providing a size gauge having a first linear surface against which a first flat of the nut is placed, and a second linear surface against which a second flat of the nut which is adjacent the first flat is placed;
 configuring the first and second linear surfaces so that they define an angle of about 120 degrees relative to each other; and
 indexing distance markings on the side gauge at or near the first linear surface, the distance markings providing an across flat measurement of the nut based on the length of the flat of the nut.

17. A method as claimed in claim 16 further comprising:
 providing a third surface against which a stud shaft is placed, and a fourth surface against which the stud shaft is placed;
 configuring the third and fourth surfaces so that they defined an angle of about 90 degrees relative to each other; and
 indexing distance markings on the side gauge at or near the third surface, the distance markings providing a stud size for the shaft based on the diameter of the shaft.

* * * * *